United States Patent
Wren

[11] Patent Number: 5,818,519
[45] Date of Patent: Oct. 6, 1998

[54] SURVEILLANCE CAMERA MOUNTING APPARATUS

[76] Inventor: Clifford T. Wren, 2036 Honeysuckle La., Jefferson City, Mo. 65109

[21] Appl. No.: 587,392

[22] Filed: Jan. 17, 1996

[51] Int. Cl.$^6$ .............................. H04N 5/225; H04N 7/18
[52] U.S. Cl. ......................... 348/151; 348/153; 348/373; 396/427; 206/588; 206/592
[58] Field of Search ..................... 248/318, 345; 206/588, 592; 348/143, 151, 153, 207, 373, 375; 396/419, 427; H04N 9/47, 7/18, 5/225

[56] References Cited

U.S. PATENT DOCUMENTS

| | | | |
|---|---|---|---|
| Re. 34,989 | 7/1995 | Struhs et al. ........................... 348/151 |
| 3,720,147 | 3/1973 | Bemis ....................................... 95/86 |
| 3,732,368 | 5/1973 | Mahlab ................................. 178/7.81 |
| 3,739,703 | 6/1973 | Behles ...................................... 95/15 |
| 4,080,629 | 3/1978 | Hammond et al. ..................... 358/229 |
| 4,160,999 | 7/1979 | Claggett ................................. 358/108 |
| 4,225,881 | 9/1980 | Tovi ....................................... 358/108 |
| 4,326,218 | 4/1982 | Coutta et al. .......................... 358/108 |
| 4,337,482 | 6/1982 | Coutta ................................... 358/108 |
| 4,414,576 | 11/1983 | Randmae ............................... 348/373 |
| 4,676,622 | 6/1987 | Hortenhuber .......................... 354/293 |
| 4,764,008 | 8/1988 | Wren ....................................... 354/81 |
| 4,796,039 | 1/1989 | Pagano .................................... 354/81 |
| 4,833,534 | 5/1989 | Paff et al. ............................... 358/108 |
| 4,855,823 | 8/1989 | Struhs et al. ........................... 358/108 |
| 4,920,367 | 4/1990 | Pagano .................................... 354/81 |
| 4,984,089 | 1/1991 | Stiepel et al. .......................... 358/229 |
| 5,032,856 | 7/1991 | McMinn ................................. 354/81 |
| 5,089,895 | 2/1992 | Fraker et al. ........................... 358/229 |
| 5,121,215 | 6/1992 | Boers et al. ............................ 358/229 |
| 5,153,623 | 10/1992 | Bouvier ................................... 354/81 |
| 5,200,818 | 4/1993 | Neta et al. ............................... 348/39 |
| 5,223,872 | 6/1993 | Stiepel et al. ............................ 354/81 |
| 5,394,184 | 2/1995 | Anderson et al. ...................... 348/151 |
| 5,394,209 | 2/1995 | Stiepel et al. ............................ 354/81 |
| 5,404,182 | 4/1995 | Nomura ................................. 348/836 |
| 5,430,511 | 7/1995 | Paff et al. ................................ 354/81 |
| 5,726,706 | 3/1998 | Walsh .................................... 348/151 |

*Primary Examiner*—Andrew I. Faile
*Assistant Examiner*—Ngoc-Yen Vu
*Attorney, Agent, or Firm*—Howell & Haferkamp, L.C.

[57] ABSTRACT

A surveillance camera mounting apparatus formed from a lightweight, elastically deformable material, such as foam plastic, for mounting a surveillance camera in a transparent enclosure of the type used on a building surface such as a ceiling or wall. The mounting apparatus comprises an elastically deformable body element which includes a camera-receiving opening for receiving and holding a surveillance camera therein. The resiliency of the body element enables a portion of the body element which surrounds the camera-receiving opening to elastically deform thereby permitting the camera-receiving opening to dilate to accommodate the surveillance camera. Due to its resiliency, the body element resists such deformation and the camera-receiving opening closes around the surveillance camera and conforms to the camera thereby holding the camera within the opening. The body element is mounted within the transparent enclosure, the resiliency of the body element enabling it to elastically deform to conform to the interior surface of the enclosure so that the body element substantially fills the space between the camera and the interior surface of the enclosure.

17 Claims, 3 Drawing Sheets

SURVEILLANCE CAMERA MOUNTING APPARATUS

BACKGROUND OF THE INVENTION

I. Field of the Invention

The present invention relates generally to a mounting and shielding device for holding a surveillance camera within a hollow sphere-shaped or dome-shaped enclosure that is suspended from a ceiling or wall. More particularly, the invention relates to an improved arrangement for mounting and shielding such surveillance cameras comprising partial sphere-shaped sections of lightweight, elastically deformable material, such as a foam plastic, that are placed into the hollow enclosures, the foam plastic sections having slots or openings for receiving and holding surveillance cameras therein.

II. Prior Art

It is common, particularly in places of business, to use surveillance cameras to monitor activities occurring within an area to be controlled. For example, such cameras are often used in retail stores and banks to catch or deter thieves. While over head surveillance cameras can serve as an effective deterrent, by reminding customers that they are being watched, it is often preferable to provide a surveillance system in a more discreet manner. Even when the presence of a surveillance camera is readily noticeable, it is in some cases desirable to hide the particular direction of viewing of the camera. When the particular direction of viewing of the camera is hidden from view, it is more difficult for a thief to ascertain, at a glance toward the camera, whether it is likely that he is momentarily within its view.

In the prior art, surveillance cameras have been mounted within the interior of hollow spherical or dome-shaped enclosures, or behind flat enclosures, by rigid metal bracket or frame arrangements. The support arrangements require some means of rigidly fastening a bracket or frame member to the camera itself and other means for securing the arrangement to a fixed surface other than the enclosure so that the camera may be independently suspended within the enclosure and aimed outwardly from the enclosure at an area to be viewed. The rigid support arrangements of the prior art are cumbersome in that they are heavy and usually have numerous parts. Also, in the prior art, the dome-shaped enclosures must be mirrored, as by being at least partially metallized, so that the camera held therein is shielded from the view of an observer in the selected area while still allowing light to pass through the enclosure from the area to the camera.

It is a principal object of this invention to provide a means of independently supporting a surveillance camera within a dome-shaped enclosure or behind a flat glass enclosure without the need for cumbersome bracket or frame arrangements comprised of numerous rigid metal members.

A further object is to provide an arrangement which serves both a camera-supporting function and a camera-shielding function inexpensively. Further objects are to provide such a support means in a lightweight, one piece device that is capable of use in many existing surveillance camera enclosures.

SUMMARY OF THE INVENTION

The foregoing objects are attained in the present invention which comprises a surveillance camera mounting apparatus formed from a lightweight, elastically deformable material, such as foam plastic, having at least one slit or opening for receiving and holding a surveillance camera therein. The foam plastic mounts are placed within hollow spherical enclosures which are constructed of transparent plastic or glass. They are also used behind hemispherical enclosures mounted flush against a wall or ceiling, quarter-sphere enclosures mounted against a wall where it meets a ceiling, and eighth-sphere enclosures positioned at a corner of a wall where it meets a ceiling. Some embodiments of the foam plastic mounts can also be used behind flat panels of transparent plastic or glass in lieu of spherical or semi-spherical enclosures.

The foam plastic camera mounts serve at least two purposes. First, the foam plastic mounts are made of a soft, but resilient foam plastic which provides a means for stably mounting the cameras within the enclosures. Second, the camera mounts are opaque and block the camera from the view of an observer from outside the enclosure. The foam plastic is preferably of a dark color.

State of the art surveillance cameras are available in compact sizes weighing only a few ounces and measuring only a couple of inches in length and width. The slits or openings in the foam plastic mount are configured to receive and hold such cameras while allowing the lenses of the cameras to be aimed radially outwardly from the enclosure and toward an area to be monitored. The foam plastic surrounding each slit or opening expands to accommodate a camera inserted therein and provides stable support for the camera.

The surveillance camera mounts of the present invention are desirable over prior art mounting arrangements since one or more cameras may be independently supported within a dome-shaped enclosure without the need for expensive and cumbersome bracket or frame arrangements constructed of numerous rigid metal members fastened to one another. Moreover, the foam plastic mounts of the present invention serve both a camera-supporting function and a camera-shielding function inexpensively and by means of a lightweight, one piece device that is capable of use in many existing surveillance camera enclosures.

While the principal advantages and features of the present invention have been described above, a more complete and thorough understanding and appreciation for the invention may be attained by referring to the drawings and description of the preferred embodiment which follow.

BRIEF DESCRIPTION OF THE DRAWINGS

Further objects and features of the present invention are revealed in the following detailed description of the preferred embodiment of the invention and in the drawing figures wherein.

DETAILED DESCRIPTION OF THE PREFERRED EMBODIMENT

Figure 1A:
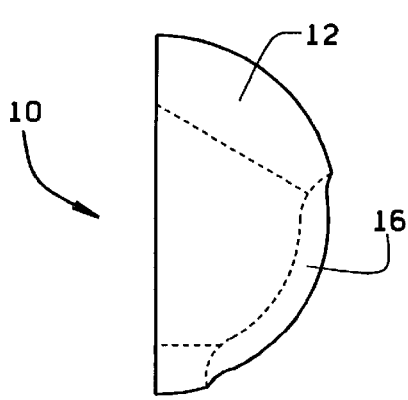
FIG. 1A is side view of a foam plastic surveillance camera mount.
Figure 1B:
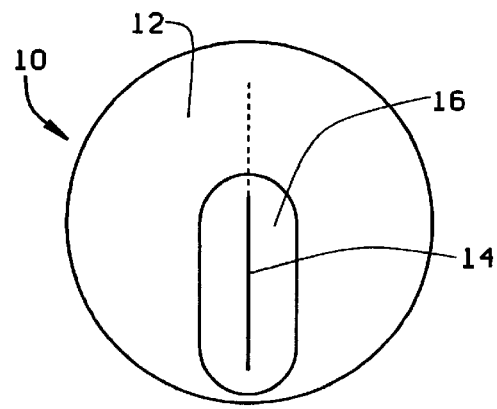
FIG. 1B is a top view of the mount.
Figure 1C:
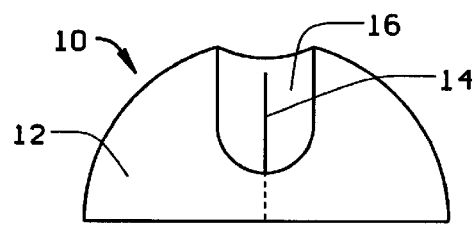
FIG. 1C is front elevational view of the mount.

Referring in more detail to the drawings, a first embodiment of the surveillance camera mounting apparatus of the present invention is shown generally in FIGS. 1A, 1B, and 1C as 10. The apparatus is formed from a light-weight, elastically deformable material, such as foam plastic, for mounting a surveillance camera within a transparent enclosure (not shown) of the type used on a building surface such as a ceiling or wall. Typically, the enclosure will have a spherical or semi-spherical configuration. An interior surface of the enclosure defines a hollow interior of the enclosure.

The mounting apparatus 10 comprises an elastically deformable body element 12 which has a solid, half-sphere shape and which includes a camera receiving slit opening 14 for receiving and holding a surveillance camera therein. The half-sphere shape of the element 12 is dimensioned to closely conform to the spherical interior surface of the enclosure. An oblong groove 16 is cut in the surface of the body element 12 to accommodate expansion of the body element 12 when a camera is inserted into opening 14. The slit opening 14 passes completely through the material of the apparatus from a back surface 18 to the groove 16 in the front surface.

Figure 1D:
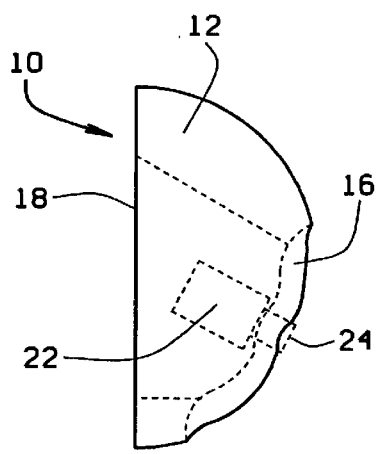
FIG. 1D is side view of the mount shown with a surveillance camera which is depicted in phantom.
Figure 1E:
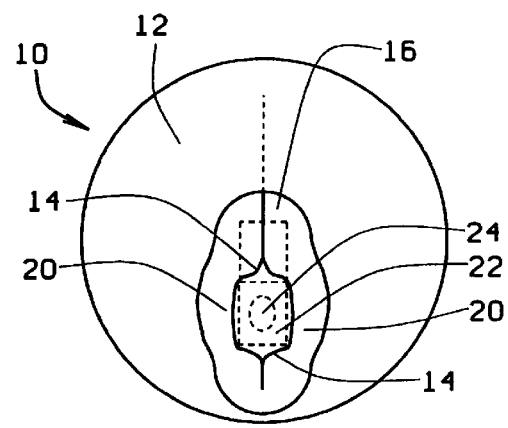
FIG. 1E is a top view of the mount shown with a surveillance camera which is depicted in phantom.
Figure 1F:
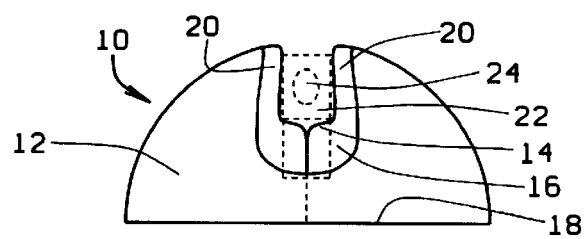
FIG. 1F is front elevational view of the mount shown with a surveillance camera which is depicted in phantom.

FIGS. 1D, 1E, and 1F show the surveillance camera mounting apparatus of the present invention with a surveillance camera, shown in phantom as 22, inserted in the opening 14. The resiliency of the body element 12 enables a portion of the body element 20 which surrounds the camera receiving opening 14 to elastically deform, thereby permitting the camera receiving slit opening 14 to expand to receive the surveillance camera 22. Due to its resiliency, the body element 12 resists such elastic deformation and the portion of the body element 20 which surrounds the camera receiving opening 14 closes around and conforms to the surveillance camera 22, thereby holding the camera within opening 14.

The oblong groove 16 defines a void between the body element 12 and the interior surface of the enclosure (not shown). The void enables a portion of the body element 12 which surrounds the groove 16 to expand by elastic deformation into the void and toward the interior surface of the enclosure as the camera 22 is inserted into camera receiving opening 14. The portion of the body element 12 which surrounds the groove 16 thereby occupies a portion of the void, enabling the body element 12 holding the camera 22 to fit within the interior surface of the enclosure. The resiliency of the body element 12 enables it to elastically deform to conform to the interior surface of the enclosure when the body element 12 is mounted within the enclosure. Therefore, the body element 12 substantially fills the space between the camera 22 and the interior surface of the enclosure. The body element 12, when mounted within the enclosure, thereby provides a means for stably mounting the surveillance camera within the enclosure.

The surveillance camera 22 is inserted into the camera receiving opening 14 such that a lens portion, shown in phantom as 24, of the surveillance camera 22 is aimed outwardly from the camera receiving opening 14. The camera 22 and the body element 12 may be adjusted within the transparent enclosure so that the surveillance camera 22 is aimed radially outwardly through the enclosure and toward an area to be monitored. The friction engagement of the body element front surface and the interior surface of the enclosure holds the body element 12 and the camera 22 stationary within the enclosure.

Figure 2A:
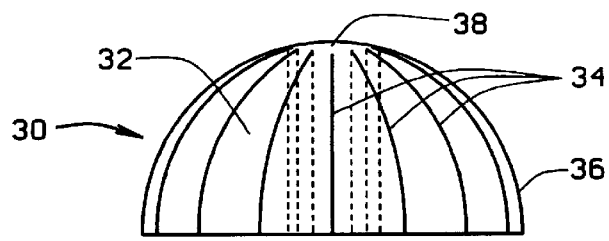
FIG. 2A is a side elevational view of a second embodiment of the foam plastic surveillance camera mount.
Figure 2B:
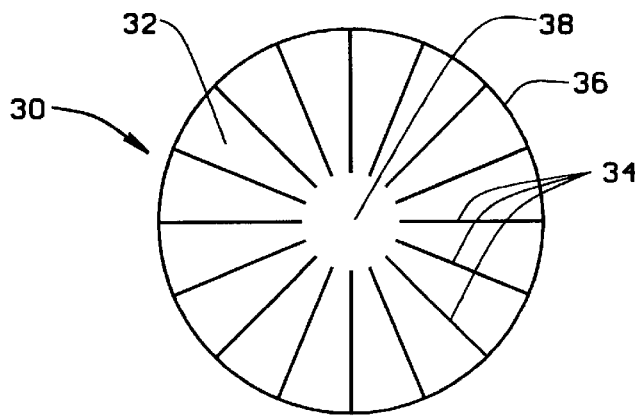
FIG. 2B is a top view of the second embodiment.

In FIGS. 2A and 2B, another embodiment of the surveillance camera mounting apparatus is shown generally as 30. This embodiment of the mounting apparatus 30 comprises an elastically deformable body element 32 which has a solid, half-sphere shape generally the same as the previous embodiment, but which includes a plurality of camera receiving slits 34 which are cut into the body element 32. The slits 34 extend radially from the periphery 36 of the body element 32 toward its center 38 and terminate before reaching the center 38. The slits 34 are angularly spaced around the body element 32. A surveillance camera is inserted into one of the plurality of slits 34 and is supported therein by the sides of one of the slit. Again, the resiliency of the body element 32 enables portions of the body element on each side of one of the camera receiving slits 34 to elastically deform, thereby permitting the camera receiving slit 34 to expand to accommodate a surveillance camera. Due to its resiliency, the body element 32 resists such deformation and the portion of the body element 32 which surrounds the camera receiving slit 34 closes around and conforms to the surveillance camera, thereby holding the camera in the slit 34. This embodiment 30 permits several cameras to be mounted within the same body element 32 simultaneously by inserting additional cameras into the other slits.

As with the embodiment described in FIGS. 1A through 1F, this embodiment 30 is used in a hollow, transparent enclosure (not shown) having a spherical or semi-spherical shape. The resiliency of the body element 32 enables it to elastically deform to conform to the interior surface of the transparent enclosure, thereby filling substantially all of the space between the camera and the interior surface of the enclosure. The body element 32 thereby provides a means for stably mounting the camera within the enclosure.

Figure 3A:
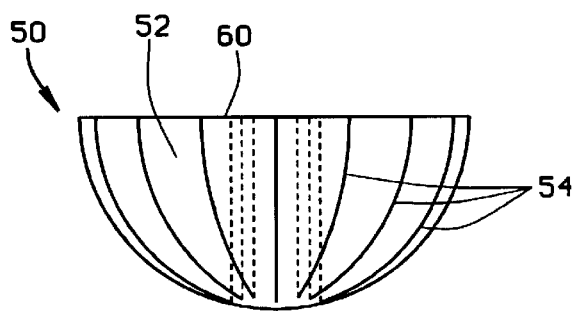
FIG. 3A is a front elevational view of a third embodiment of the foam plastic surveillance camera mount.
Figure 3B:
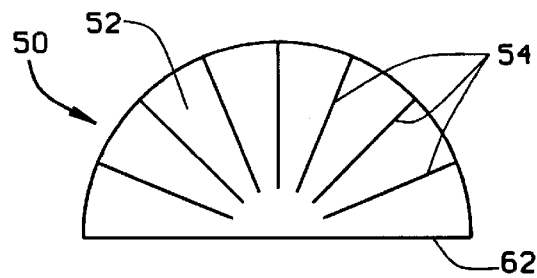
FIG. 3B is a bottom view of the third embodiment.
Figure 3C:
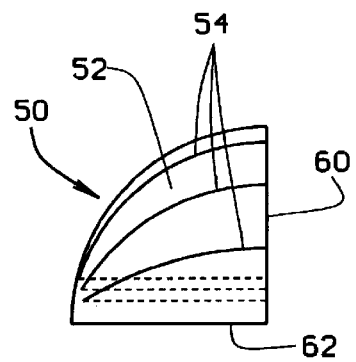
FIG. 3C is a side view of the third embodiment.

Yet another embodiment of the surveillance camera mounting apparatus of the present invention is shown generally as 50 in FIGS. 3A, 3B, and 3C. This embodiment of the mounting apparatus 50 is identical to the previously described embodiment 30, except that it comprises an elastically deformable body element 52 which has a solid quarter-sphere shape rather than a half-sphere shape. The body element 52 includes a plurality of camera receiving slits 54 which are angularly spaced around the body element 52. This embodiment 50 is used in a quarter-sphere shaped surveillance camera enclosure that is positioned against a corner where a wall and a ceiling meet, with the top surface 60 of the body element 52 adjacent to the ceiling, and the rear surface 62 of the body element 52 adjacent to the wall. The means for stably mounting a surveillance camera are identical in structure and function to that of the previously described embodiment 30. This embodiment 50 also permits several cameras to be mounted simultaneously within the same body element 52.

Figure 4C:
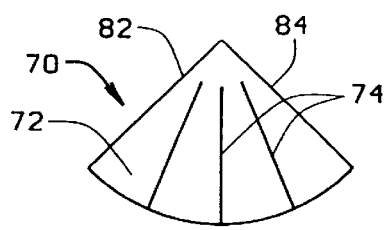
FIG. 4C is a top view of the fourth embodiment.
Figure 4A:
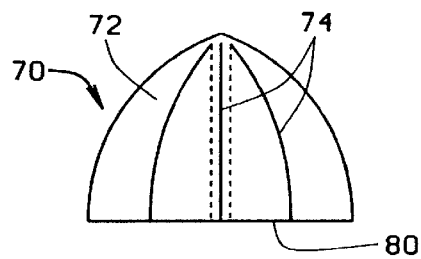
FIG. 4A is a front elevational view of a fourth embodiment of the foam plastic surveillance camera mount.
Figure 4B:
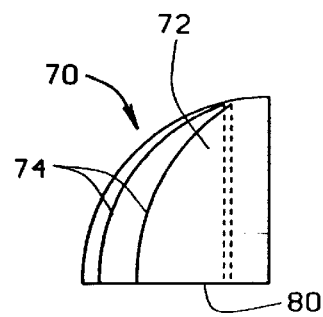
FIG. 4B is a side elevational view of the fourth embodiment.

Still another embodiment of the surveillance camera mounting apparatus is shown generally as 70 in FIGS. 4A, 4B, and 4C. This embodiment of the mounting apparatus 70 is identical to the previously described embodiments 30 and 50, except that it comprises an elastically deformable body element 72 which has a solid, eighth-sphere shape, rather than a half-sphere or quarter-sphere shape. The body element 72 includes a plurality of camera receiving slits 74 which are cut into the body element 72. This embodiment 70 is used in an eighth-sphere shaped surveillance camera enclosure that is positioned at a corner where two walls and a ceiling meet, with the top surface 80 of the body element 72 adjacent to the ceiling, and rear surfaces 82, 84 of the body element 72 adjacent to the walls. The means for stably mounting a surveillance camera are identical in structure and function to that of the previously described embodiments 30 and 50. This embodiment 70 also permits several cameras to be mounted simultaneously within the same body element 72.

Figure 5B:
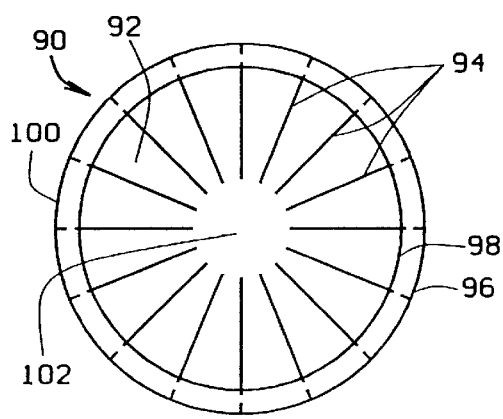
FIG. 5B is a bottom view of the fifth embodiment.
Figure 5A:
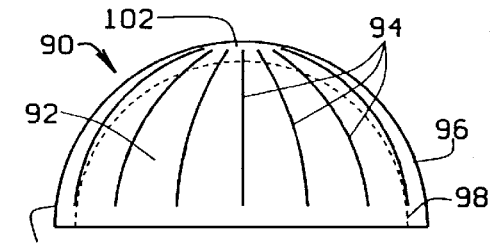
FIG. 5A is a side elevational view of a fifth embodiment of the foam plastic surveillance camera mount.

A further embodiment of the surveillance camera mounting apparatus of the present invention is shown generally as 90 in FIGS. 5A and 5B. This embodiment of the mounting apparatus 90 comprises an elastically deformable body element 92 having a hollow, half-sphere configuration, as opposed to a solid configuration. This embodiment 90 includes a plurality of camera receiving slits 94 which are cut into the body element 92. Each slit of the plurality of slits 94 extend radially inwardly from a point near the periphery 100 of the body element 92 to another point near the center 102 of the body element 92. The slits 94 do not fully extend to the periphery 100 or the center 102 of the body element 92. The slits 94 are angularly spaced around the body element 92. A surveillance camera may be mounted inside the hollow body element 92 with the lens portion of the camera inserted through one of the plurality of slits 94. Because only the lens portion of the surveillance camera emerges from the camera receiving slits 94, the body of the camera is substantially blocked from view behind the transparent enclosure.

Though hollow, the body element 92 may be formed with a thickness between its outer surface 96 and its interior surface 98 which is sufficient to provide the same independent support for surveillance cameras inserted into the slits 94 as is provided by a solid body element. Alternatively, the camera could be supported by a stationary bracket with the lens protruding through the body element 92. As with the previously described body elements, portions of the body element 92 surrounding the slits 94 elastically deform, thereby allowing the slits 94 to expand to accommodate surveillance cameras.

Figure 6A:
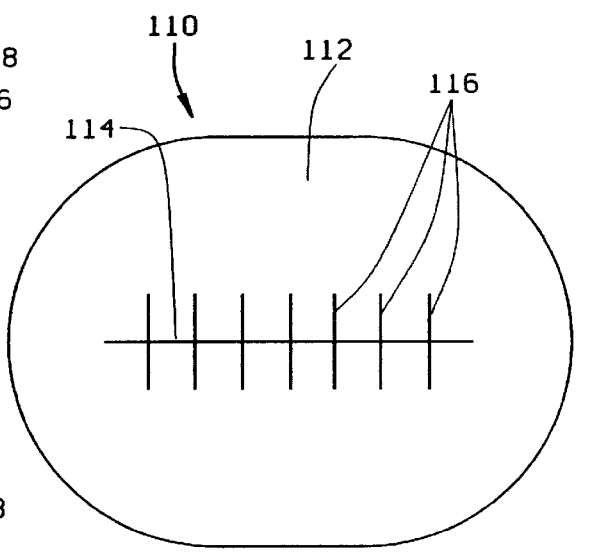
FIG. 6A is top view of a sixth embodiment of the foam plastic surveillance camera mount.
Figure 6B:
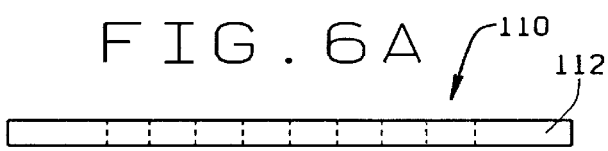
FIG. 6B is a side elevational view of the sixth embodiment.

Another embodiment of the surveillance camera mounting apparatus of the present invention is shown generally as 110 in FIGS. 6A and 6B. This embodiment of the mounting apparatus 110 comprises an elastically deformable body element 112 having an oblong shape and a narrow thickness. This embodiment 110 is flat, rather than spherical or semi-spherical, and is used behind flat panels of transparent plastic or glass (not shown) in lieu of spherical or semi-spherical enclosures. The body element 112 includes a center slit 114 extending along its major axis and a plurality of transverse slits 116 which are spaced along the center slit 114 and which are oriented parallel to the minor axis of the body element 112. Surveillance cameras may be mounted behind the body element 112 with the lenses of the cameras inserted through the slits 114, 116. Because only the lens portions of the surveillance cameras emerge from the slits 114, 116, the bodies of the cameras are substantially blocked from view behind the transparent panel or enclosure.

Though flat, the body element 112 may be formed with a thickness which is sufficient to provide independent support for surveillance cameras that are inserted into the slits 114, 116. Alternatively, the camera could be supported by a stationary bracket with the lens protruding through the body element 112. As with the previously described embodiments, portions of the body element 112 surrounding the slits 114, 116 elastically deform, thereby allowing the slits 114, 116 to expand to accommodate surveillance cameras.

Each of the above described embodiments of the surveillance camera mounting apparatus are opaque and preferably of a dark color. In addition to their camera supporting functions, each embodiment serves to obscure the surveillance cameras from view behind the transparent enclosures. Because only the lens portions of the surveillance cameras emerge from the camera receiving opening or slits, the bodies of the cameras are substantially blocked from the view of an observer from outside the enclosures. Additionally, the transparent enclosures may be tinted, reflective or mirrored, as by being partially metallized, to further shield the cameras from view.

While the present invention has been described by reference to a specific embodiment, it should be understood that modifications and variations of the invention may be constructed without departing from the scope of the invention defined in the following claims.

What is claimed is:

1. A surveillance camera mounting apparatus for mounting a surveillance camera to a surveillance camera enclosure of the type configured for use on a building surface such as a ceiling or wall, the enclosure having at least one wall, at least a portion of said at least one wall being sufficiently transparent to enable the camera to view an area to be monitored through said at least one wall, said at least one wall having an interior surface defining a camera-housing cavity for housing the camera, the mounting apparatus comprising a body configured for holding the camera in the camera-housing cavity of the enclosure and for substantially filling voids between the camera and the interior surface of the enclosure, said body having a camera-receiving opening configured for receiving the surveillance camera, wherein said body is of a resilient material which is elastically deformable.

2. The surveillance camera mounting apparatus of claim 1 wherein said body is configured for conforming to a shape of the interior surface of the enclosure.

3. The surveillance camera mounting apparatus of claim 2 wherein the body has a curved configuration, the curved configuration forming at least a portion of a sphere.

4. The surveillance camera mounting apparatus of claim 1 wherein said body is configured such that the camera-receiving opening expands to receive the surveillance camera as the surveillance camera is inserted into the camera-receiving opening.

5. The surveillance camera mounting apparatus of claim 1 wherein the resiliency of said body enables a portion of said body surrounding the camera-receiving opening to elastically deform to permit the camera-receiving opening to expand to receive the surveillance camera.

6. The surveillance camera mounting apparatus of claim 5 wherein the elastic deformation in the portion of said body surrounding the camera-receiving opening creates an elastic force which resists the elastic deformation, the portion of said body surrounding the camera-receiving opening tending to conform to the shape of the camera in response to the elastic force and tending to grasp the camera to support the camera within the camera-receiving opening.

7. The surveillance camera mounting apparatus of claim 5 wherein said body has a recessed area, the recessed area defining a void between said body and the interior surface of the enclosure when the body is inserted into the enclosure, the void enabling a portion of said body surrounding the recessed area to expand by elastic deformation into the void and toward the interior surface of the enclosure as the camera is inserted into the camera-receiving opening, the portion of said body surrounding the recessed area thereby occupying the void.

8. The surveillance camera mounting apparatus of claim 1 wherein said body is opaque to hide the camera from view of a person in the area to be monitored.

9. A surveillance camera mounting apparatus for mounting a surveillance camera within a surveillance camera enclosure of the type configured for use on a building surface such as a ceiling or wall, the enclosure having at least one wall sufficiently transparent to enable the camera to view an area to be monitored through said at least one wall, said at least one wall having an interior surface defining a camera-housing cavity for housing a camera, the mounting apparatus comprising:

a body configured for holding and shielding from view the camera in the camera-housing cavity of the enclosure and for substantially filling voids between the camera and the interior surface of the enclosure, wherein said body is of a resilient material which is elastically deformable, the resiliency permitting said body to conform to the shape of the interior surface of the enclosure.

10. The surveillance camera mounting apparatus of claim 9 wherein said body has a camera-receiving opening configured for receiving the surveillance camera, the camera-receiving opening being configured to dilate to accommodate the surveillance camera as the surveillance camera is inserted into the camera-receiving opening.

11. The surveillance camera mounting apparatus of claim 10 wherein the resiliency of said body enables a portion of said body surrounding the camera-receiving opening to elastically deform to permit the opening to dilate.

12. The surveillance camera mounting apparatus of claim 11 wherein the portion of said body which elastically deforms opposes such deformation due to its resiliency, the opposing portion tending to close around the camera in response to such opposition, the opposing portion tending to grasp the camera to support the camera within the camera-receiving opening.

13. The surveillance camera mounting apparatus of claim 11 wherein said body has a recessed area, the recessed area defining a void between said body and the interior surface of the enclosure when the body is inserted in the enclosure, the void enabling a portion of said body surrounding the recessed area to expand by elastic deformation into the void and toward the interior surface of the enclosure as the camera is inserted in the camera-receiving opening.

14. The surveillance camera mounting apparatus of claim 9 wherein said body is opaque and shields the camera from view of a person in the area to be monitored.

15. The surveillance camera mounting apparatus of claim 9 wherein the body has a curved configuration, the curved configuration forming at least a portion of a sphere.

16. A method of mounting a surveillance camera in a transparent surveillance camera enclosure of the type configured for use on a building surface such as a ceiling or wall, the method comprising the steps of:

forming a body element from a resilient material which is elastically deformable so that the body element has substantially the same shape as an interior surface of the enclosure;

forming a camera-receiving opening in the body element for receiving the surveillance camera, the camera-receiving opening being formed with a smaller cross-sectional area than the surveillance camera;

inserting the camera into the camera-receiving opening;

mounting the body element into the interior of the enclosure so that the body element substantially fills voids in the interior of the enclosure between the camera and the enclosure, the resiliency of the body element enabling it to elastically deform so that the outer surface of the body element substantially conforms to the interior surface of the enclosure.

17. The method of claim 16 further comprising the steps of:

dilating the camera-receiving opening to accommodate the surveillance camera by elastically deforming a portion of the body element that surrounds the camera-receiving opening;

inserting the surveillance camera into the camera-receiving opening so that a lens portion of the surveillance camera is aimed outwardly from the camera-receiving opening;

adjusting the body element within the enclosure so that the camera is aimed outward through the enclosure and toward an area to be monitored.

* * * * *